June 14, 1932. H. SCHIBSTED 1,863,355
METHOD OF TREATING MILK POWDER
Filed Jan. 29, 1925 4 Sheets-Sheet 1
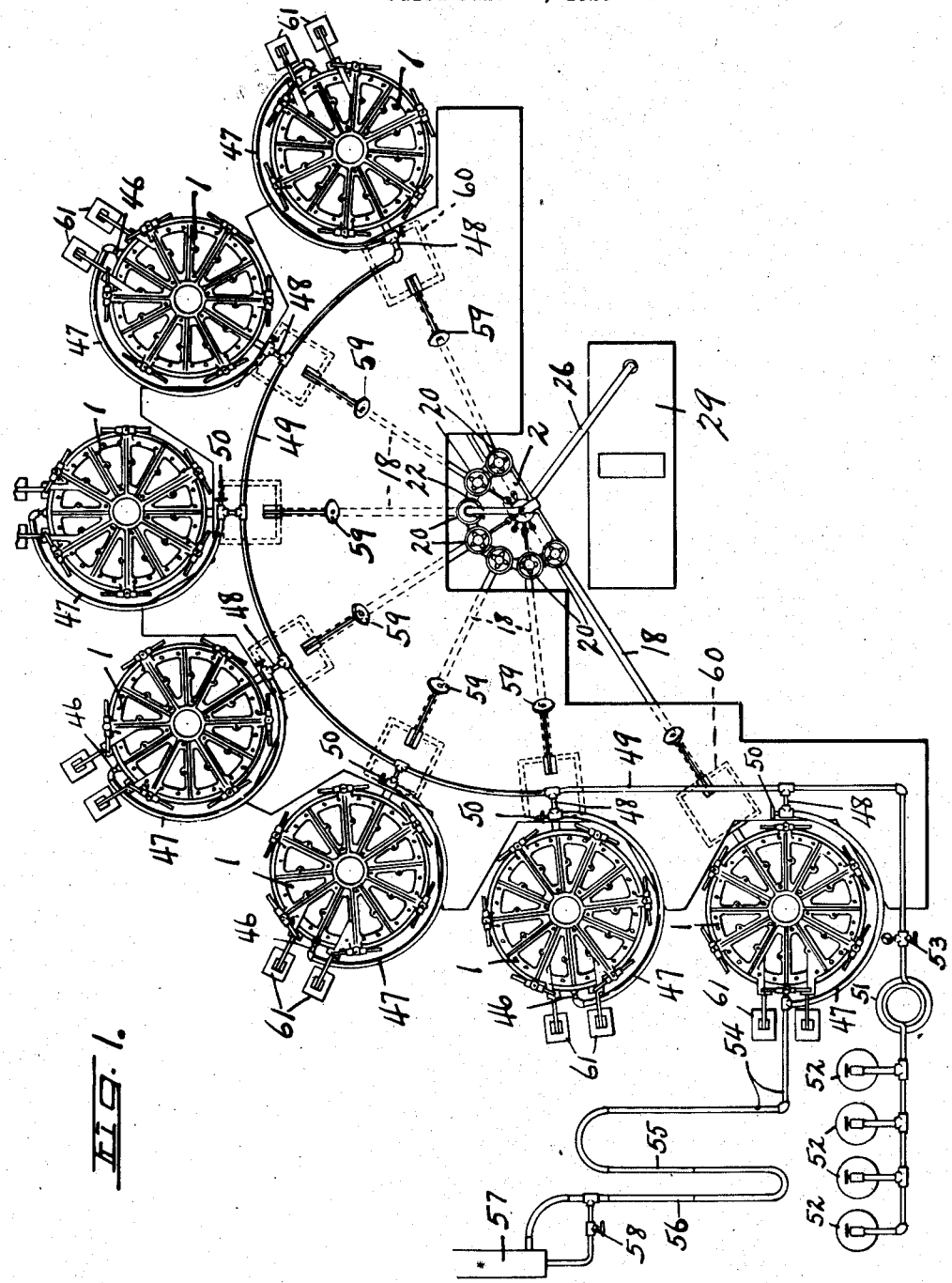

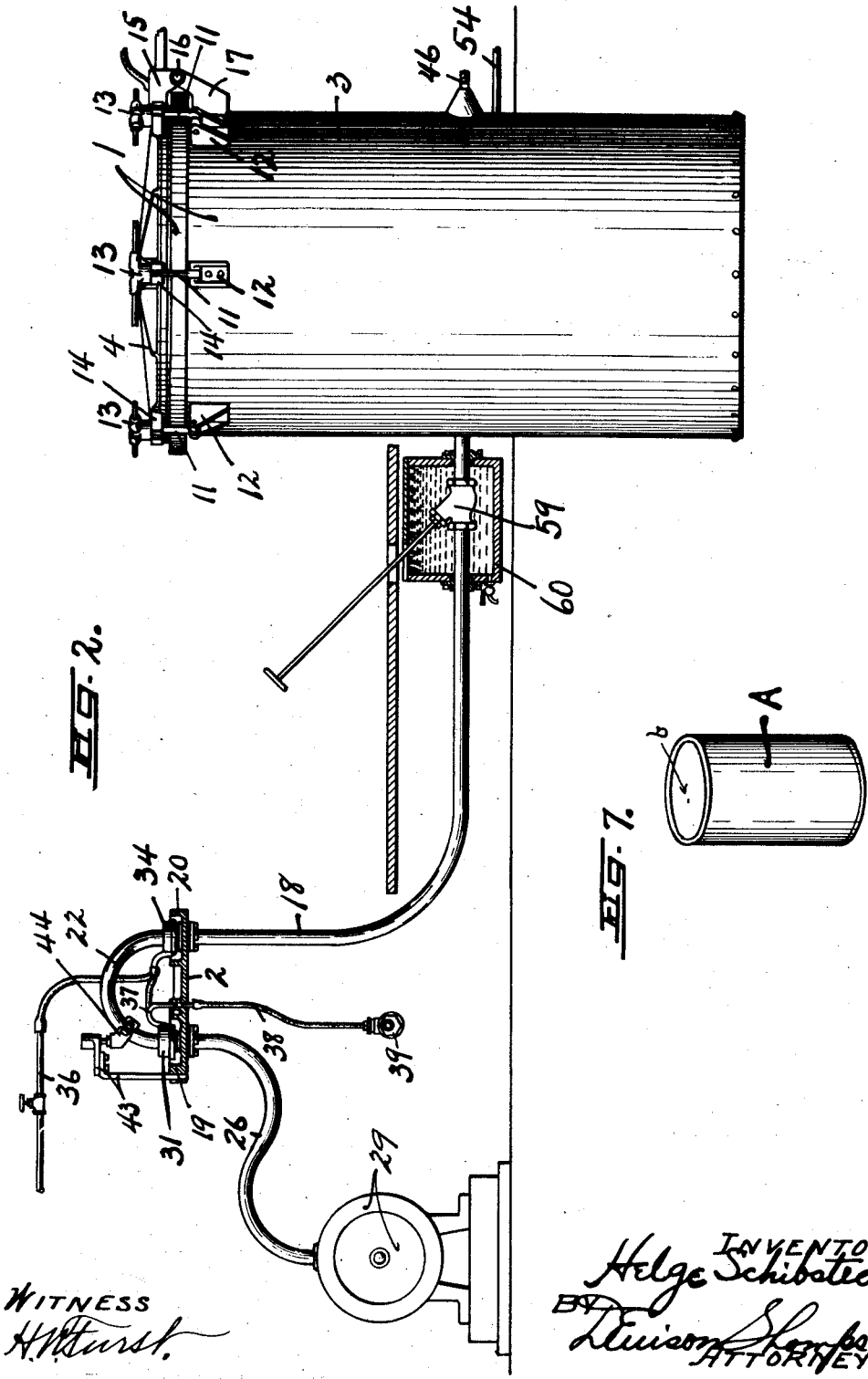

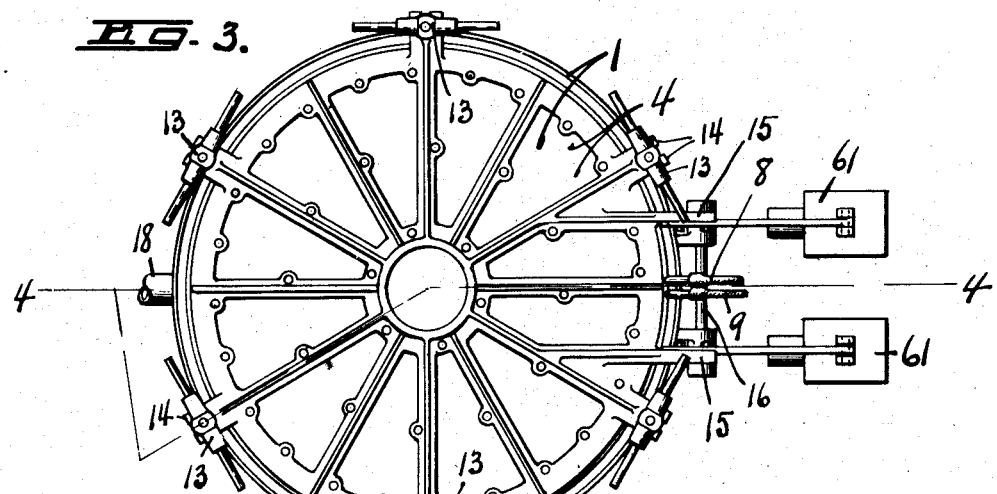
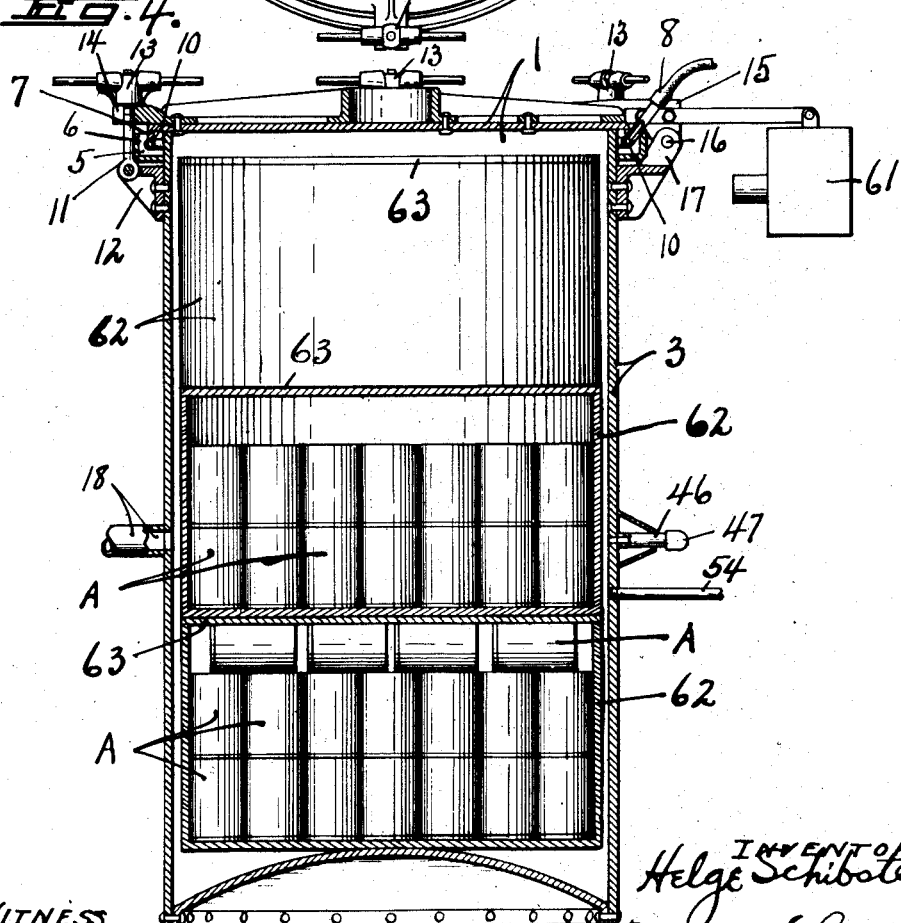

June 14, 1932. H. SCHIBSTED 1,863,355
METHOD OF TREATING MILK POWDER
Filed Jan. 29, 1925 4 Sheets-Sheet 4
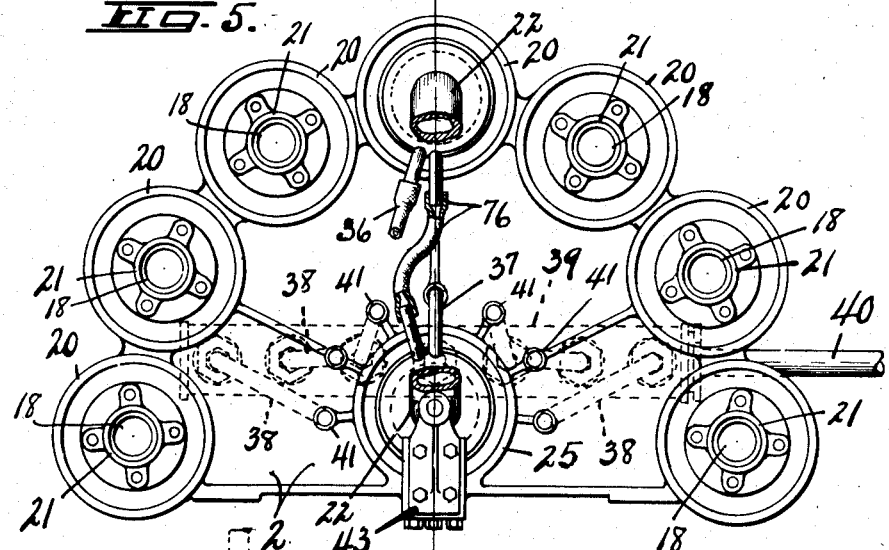
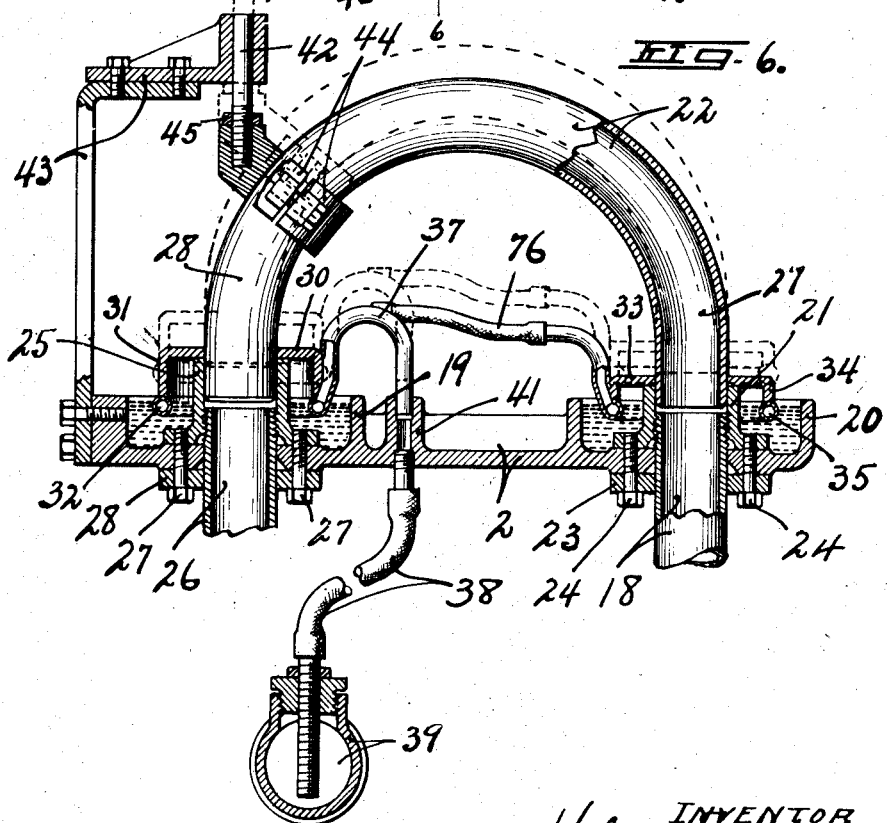

Patented June 14, 1932

1,863,355

UNITED STATES PATENT OFFICE

HELGE SCHIBSTED, OF SYRACUSE, NEW YORK, ASSIGNOR, BY MESNE ASSIGNMENTS, TO THE BORDEN COMPANY, OF NEW YORK, N. Y., A CORPORATION OF NEW YORK

METHOD OF TREATING MILK POWDER

Application filed January 29, 1925. Serial No. 5,643.

This invention relates to a new and improved method of treating milk powder, and to the new product, or article of commerce produced thereby.

Heretofore, milk powder, particularly milk powder containing butter-fat, as whole-milk powder, or cream powder, has been of quite limited keeping quality, and altho packed in air-tight containers, would, after a few months, develop a tallowy flavor, due doubtless to oxidization of the butter-fat as a result of the fact that the enclosing receptacle or can contains considerable free or uncombined oxygen, not only oxygen present in the air around the particles of the powder, but also free or uncombined oxygen contained in or adhered to the particles of the powder.

By the expression "free or uncombined oxygen," as used in the specification and claims hereof, I mean the element oxygen consisting of two atoms of oxygen and being the molecular from $O_2$ contained in air, and I do not mean to include the oxygen chemically combined with the elements in the various constituents of the milk-powder.

The main object of this invention is the production of a milk powder product, or article of commerce, particularly a milk-powder product, which altho containing substantial quantities of butter-fat, will keep for long periods of time without developing a tallowy, or rancid flavor.

I have found that the free or uncombined oxygen content of cans adapted to contain the milk-powder is about 75 cu. centimeters of oxygen for each pound of powder. When all of the air in the space around the powder is removed down to a pressure of one or two millimeters of mercury, there still remains adhered to or contained in the powder seven or eight cu. centimeters of free or uncombined oxygen (measured under standard conditions), and this amount of free or uncombined oxygen contained in or adhered to the powder is sufficient in itself to cause development of the tallowy flavor referred to.

Further, ordinary air has about 21% oxygen, whereas the air contained in or adhered to the powder has approximately 35% oxygen, showing that milk-powder is selective in its absorption of the gases of the air, and its absorption co-efficient is higher for oxygen than nitrogen, so that the contained air is richer in oxygen than ordinary air, and therefore, more harmful.

For these reasons, it is therefore essential that a portion of this contained or adhered oxygen be removed from the powder if the desired keeping quality is to be attained, and I have found that the free or uncombined oxygen included with each pound of powder should be reduced below 5 cu. centimeters per pound if a product having the desired keeping qualities is to be produced.

I have further discovered that the oxygen adhered to or contained in the powder cannot be removed by merely drawing a vacuum upon the powder, even tho that vacuum be a substantially perfect one, and it is necessary in reducing the free or uncombined oxygen content below the limit stated that the milk powder be maintained under a vacuum or surrounded by a gas that is a vacuum for free or uncombined oxygen for a considerable period of time, for illustration, 20 hours, during which time the adhered or contained free or uncombined oxygen is slowly given up by the powder, and the retained free or uncombined oxygen is thereby reduced in amount below the limit stated.

Further, I have discovered that most advantageous results are obtained when the method is carried on with milk powder packaged in air-tight containers which have a vent-hole of extremely small area, not greater than .0002, and preferably approaching .00006 sq. inches for each pound of powder the container is adapted to hold, whereby the container may be sealed at atmospheric pressure, while the cans are still giving off gas through the vent-hole to prevent ingress of air to the container.

I have discovered a process by means of which the free or uncombined oxygen in each one pound of powder may be reduced below five cubic centimeters (measured under standard conditions) and preferably down to about 3.5 cubic centimeters per pound of powder, whereby development of the tallowy flavor is eliminated, and further, whereby the requisite air-tightness of the receptacle may easily be determined by reason of a vacuum developed in the containers through absorption of gases by the powder enclosed in an airtight container, and I have produced such a product, and have already kept such product without the development of a tallowy flavor for more than one and one-half years.

Other objects and advantages relate to the details of the process and the detailed characteristics of the product, all as will more fully appear from the following description, taken in connection with the accompanying drawings. The apparatus illustrated in the drawings is the joint invention of Irving S. Merrell and myself, and is designed to constitute the subject matter of a co-pending application.

In the drawings:—

Figure 1 is a top plan view of such apparatus.

Figure 2 is an elevation partially in section of a unit of the apparatus.

Figure 3 is a top plan view of one of the kettles or tanks.

Figure 4 is a section on line 4—4, Figure 3.

Figure 5 is a top plan view partially in section of the distributing head.

Figure 6 is a section on line 6—6, Figure 5.

Figure 7 is an elevation of the article of commerce produced by this process previous to the sealing of the vent.

The process will be here described in connection with the apparatus illustrated, which as here shown, consists of a plurality of, in this instance seven kettles or tanks numbered —1— on the drawings, arranged substantially concentrically about a distributing head —2—, altho such arrangement is not essential to the apparatus. Each tank or kettle, as here illustrated, comprises a vertically arranged cylindrical body part —3— of any suitable diameter and depth, combined with a cover —4— adapted to close the kettle airtight.

For this purpose, the tank near its upper end is provided with an external annular channel or groove —5— formed by welding or otherwise securing an angle-bar —6— to the outer surface of the tank near its upper end. This annular chamber is adapted to be filled, or substantially filled with a suitable sealing composition, as for instance, a paraffin beeswax mixture which melts easily under the action of heat, and solidifies rapidly under the action of cold. For co-operation with the annular composition-containing channel, the cover —4— is formed with a circumferential depending flange —7— terminating in a pipe secured to the lower end of the flange in any suitable way, as by welding, such pipe having an inlet —8— and an outlet —9— for either steam or cold water, the inlet —8— being suitably connected to a source of steam, and also a source of water, suitable valves being provided for controlling flow of both fluids.

The flange —7— depends within the channel —5— and the sealing composition hardens about the pipe —10— in the channel —5— to thereby form an absolutely air-tight joint, and for the purpose of hastening the hardening of the composition, cold water may be forced through inlet —8— into the pipe —10—.

In addition, the cover —4— is held in proper position by means of a series of pivoted clamps, each consisting of a threaded rod —11— pivoted on a bracket —12— and cooperating threaded nut —13— for engaging the upper surface of bifurcated lugs —14— secured to and projecting outwardly from the edge of the cover —4— so that the threaded rods —11— may move into the bifurcated portions of the lugs, and the nuts —13— may then be tightened to lock the cover rigidly in place.

The cover is pivoted or hinged upon the body —3—, and for this purpose is formed with radial hinge members —15— mounted upon pivot rod —16— which in turn is mounted upon the hinge member —17— secured to the body —3— of the kettle in like manner, as the brackets —12— by welding, or otherwise. This structure is, therefore, capable of being rendered absolutely airtight except for the outlet for air and the inlet for gas hereinafter described, both of which are valve-controlled and capable of being rendered air-tight.

Each tank is provided with an air outlet —18— in the form of a pipe, and each of these pipes extends to, opens upwardly through and is secured to the distributing head —2—.

This distributing head, as illustrated, is formed of a substantially flat plate, and has a circular flange —19— rising from its surface near one edge, and a plurality of circular flanges —20— arising from its surface and concentrically arranged about the flange —19—, so as to form a series of cup-shape recesses, in this instance seven in number, one for each kettle or tank —1— and concentrically arranged about the chamber formed by the flange —19—. Each of the chambers formed by the circular flanges —20— has a central opening or perforation in its bottom wall, through which a pipe —18— extends, leading from a tank or kettle —1—, and this pipe is preferably as illustrated, threaded into a cylindrical sleeve —21—, which has a portion of the interior of its upper wall preferably plain for sliding engagement with the U-shape connecting pipe or yoke —22—.

The base of the sleeve —21— is flanged outwardly and secured by bolts or otherwise to the bottom wall of the chamber formed by the flange —20—, preferably concentrically arranged within the chamber, and is also concentric with the pipe —18— and the opening in the bottom wall through which the pipe —18— projects upwardly. Additional securing means may be provided in the form of a ring or washer —23— surrounding the pipe —18— below the distributing head —2— and engaged by the bolts —24— which secure the sleeve —21— in place.

It will be seen, therefore, that each of the tanks —1— has a pipe —18— and that the pipe —18— of each tank extends upwardly through an opening in the bottom wall of a respective chamber formed by one of the upstanding circular flanges —20—.

In much the same manner, the chamber formed by the upstanding circular flange —19— is provided with a concentrically arranged sleeve —25— within the chamber, and aligned with an opening in the bottom wall of the chamber through which a pipe —26— projects for threaded engagement with the interiorly threaded portion of the sleeve —25—. The sleeve —25— preferably has its base flanged outwardly and secured to the bottom wall of the chamber within the flange —19— in any suitable way, as by bolts —27— which bolts also clamp the ring or washer —28— surrounding pipe —26— against the lower surface of the distributing head —2—.

The sleeve —25— is preferably of somewhat greater axial length than the sleeves —21— and the interior surface of its upper portion is preferably smooth for sliding engagement with the other end of the U-shape pipe or yoke —22—.

It will be obvious, particularly from the disclosure of Fig. 6 that the sleeves —21— are concentrically arranged about the sleeve —25— and are all spaced equal distances from the sleeve —25— so that the end —27— of the U-shape pipe —22— can be slidably positioned in the upper portion of any one of the sleeves —21—, while the opposite end —28— of the U-shape pipe —22— remains in slidable engagement within the sleeve —25—, whereby the pipe —26— leading from the high vacuum pump —29— may be brought into communication with any one of the pipes —18—, and thereby into communication with the interior of any one of the tanks or kettles —1—.

It is essential in the operation of this apparatus for carrying out the method of this invention, that these connections be absolutely air-tight in order that the pressure in any one of the tanks may be reduced as low as one or two millimeters of mercury, and for that reason a special structure is provided for effecting air-tight relation between the U-shape pipe —22— and the pipe —26— and any one of the pipes —18—, and to effect this result each of the annular chambers formed by the upstanding flanges —20— and the concentrically arranged sleeve —21— and the chamber formed by the flange —19— and concentrically arranged sleeve —25— is filled, or partially filled with a composition that preferably can be rapidly melted by the application of heat and rapidly hardened by the application of cold, as for instance, a mixture of paraffin and beeswax.

At the end —28— the U-shaped connecting pipe —22— is provided with a laterally extending flange —30— formed at its edge with a depending flange —31—, as perhaps best illustrated in Figure 6. In other words, this structure is in substantially the form of an angle-iron surrounding the end —28— of pipe —22— and the depending flange —31— terminates in a pipe —32— extending around the lower end of the flange, and welded or otherwise secured thereto, for conveying either steam to melt the sealing compound, or cold water to hasten the hardening of the compound.

As illustrated, the flange —30— comes into contact with the upper edge of the sleeve —25— when the end —28— of the pipe is positioned within the sleeve —25—, as illustrated, and the flange —31— and pipe —32— extend into the sealing compound, whereby the joint between pipe —28— and pipe —26— is rendered absolutely air-tight.

In like manner, the opposite end —27— of pipe —22— is formed with a laterally extending circular flange —33— formed at its edge with a circular depending flange —34— provided at its lower end with a pipe —35— for conveying either steam or water in like manner as the pipe —32—, and this structure may be secured to the end —27— of pipe —22— in any suitable manner, as by welding, etc. and in connecting the pipe —22— with any one of the pipes —18—, as may be desired, the circular pipe —25— is immersed or partially immersed in the sealing composition within the chamber formed by the upstanding flange —20—, so that an absolutely tight joint may be made between the end —27— of pipe —22— and any one of the pipes —18—.

For the purpose of passing steam through the pipe —32— and the pipe —35—, a connecting pipe or conduit —36— is shown leading to any source of steam, and also any source of water, suitable valves being utilized for controlling the flow of both the steam and the cold water, and conduit —76— is shown as connected to pipe —35—, the fluid passing around the pipe —35— and escaping through connecting pipe —36— to the pipe —32— as perhaps best illustrated in Figure 5. The fluid then passes around the pipe —32— and escapes through U-shaped tube —37— to one of the pipes —38— leading to a header —39— connected by pipe —40— to any suitable waste. For the purpose of connecting the U-shape discharge pipe —37— with the header —39— in all positions of the pipe —22—, the distributing head —2— is formed with a series of perforated bosses —41— concentrically arranged about the sleeve —25— and of a number equal to the number of tanks —1—, and the number of chambers formed by upstanding flanges —20—, and so arranged that when the end —27— of pipe —22— is arranged for communication with any one of the pipes —18—, the free end of the pipe —37— will be slidably positioned within one of the respective bosses —41—.

Each of these bosses, as here shown seven in number, is connected by a threaded union with a pipe —38— leading to the header —39— which is in the form of an elongated cylinder extending substantially the entire width of and arranged beneath the distributing head —2—. However, this method of discharge is not essential, as each of the pipes —37— may discharge in any suitable way directly into a waste, if desired.

As here shown, the pipe —22— is carried by a rotary and axially movable stud —42—, journaled, as illustrated, in a two part bracket —43— carried from the distributing head —2—. The lower end of this stud may, as shown, be threaded into one section of a two part clamp —44—, the two parts of the clamp being secured together about the pipe —22— in any suitable and well known manner, as by the bolts illustrated, and by this construction, the clamp —44— is tightly secured to the pipe —22— nut —45— being provided for locking the clamp to the stud —42— the nut as shown, being spaced some distance from the lower surface of the adjacent portion of bracket —43— so as to permit axial, as well as rotary movement of stud —42—.

The axial movement is sufficient in length to permit removal of the end —27— of pipe —22— from sleeve —21—, and the pipe —22— may then be moved about the end —28— as a pivot for insertion into any other one of the sleeves —21—, the sleeve —25— being of sufficient axial length so as to prevent disengagement of the end —28— of pipe —22— from the sleeve within the normal limits of movement of clamp —44—.

However, the clamp, stud and brackets may be omitted, if desired, as the U-tube will support itself in any of the desired positions.

It will be obvious that by this construction, the vacuum pump —29— may be brought into absolutely air-tight communication with any one of the kettles —1— for producing in that kettle a substantially perfect vacuum.

The kettles —1— are further provided with an inlet pipe —46— for a gas, such as carbon-dioxide, nitrogen, or any other suitable gas not containing free or uncombined oxygen. The process will be here described in connection with $CO_2$, with the understanding that gases as above described, may be used in its place with like results, except where additional advantage may be specifically stated.

As shown, this inlet is at the opposite side of the tank from the exhaust pipe —18—, and as best illustrated in Figure 1, a substantially semi-circular pipe —47— is utilized in connection with each kettle, and a connecting tube —48— for bringing each of these gas inlets into communication with a single pipe —49—, the connection between each semi-circular pipe and the connecting tube —48— being controlled by a valve —50— so that any one, or all of the tanks —1— may be brought into communication with the pipe —49— which leads through a hot-water tank —51— to any suitable and ordinary containers —52— for carbon-dioxide, reducing valve —53— being provided for controlling the flow of the gas, and preferably as shown, the pipe —49— is coiled within the hot-water tank —51— to effect any desired heating of the gas.

Each tank —1— is provided with a suitable independent relief device so as to limit the pressure that can be produced within the tank so that it cannot rise above a pre-determined amount, as for instance, 12 pounds, and yet this relief device is of such character as to permit the production of a perfect vacuum within the tanks.

This structure consists of a pipe —54— connected to the tank, and leading to a U-tube, one leg —55— of which is of somewhat less diameter than the opposite leg —56—. For illustration, the leg —55— may be one-quarter of an inch in diameter, while the leg —56— is 5/16ths of an inch in diameter, the leg —55— being at least 32 inches long, so as to permit the production of a substantially perfect vacuum in the tanks —1— without inlet of air thereto through the U-tube when suction is produced within the tanks.

Upon the production of pressure in any one of the tanks —1— should that pressure go above the pre-determined amount, as for instance, 12 pounds, the mercury contained in its respective U-tube will be blown by the pressure into the receptacle —57— thereby permitting the escape of the gas with which the tank is charged to relieve the pressure. By opening valve —58— the mercury is permitted to return to the U-tube for future automatic control.

Each pipe —18— contains a valve —59—, by means of which communication with its respective tank is controlled, and for the purpose of rendering this valve structure air-tight, it is enclosed within a box or receptacle —60— containing oil or other liquid, to thereby produce an oil-seal rendering the valve air-tight under all conditions of operation.

For the purpose of assisting in opening the cover —4— of any one of the tanks —1—, and maintaining it in open position, each cover is shown as provided with a pair of weights —61— lying outside the pivot rod —16—, and pivotally mounted on extensions from the cover —4—, so as to substantially balance the cover.

The method of this invention as carried out in connection with the apparatus as shown, may be described substantially as follows:—

The milk powder which it is desired to package is first placed in a suitable can or container —A—. Usually these cans come with separate covers, and the covers are provided with a vent-hole —5— having a cross-sectional area of from .00006 to .0002 sq. inch per pound of powder the can is adapted to contain, i. e., we are assuming that the cans are substantially filled with powder.

The cans are sealed with these covers, and are then placed in baskets —62— as best illustrated in Figure 4. These baskets may contain any suitable number of cans, dependent upon their size, and the amount of powder which each can is adapted to contain. As at present used, each basket is adapted to contain approximately 400 one-pound cans. Each basket —62— is provided with a loose cover —63— that is rested upon the upper edge of the basket, as illustrated in Fig. 4, and does not form an air-tight joint with the body of the basket. Any number of these baskets may be placed in one of the tanks —1—, and as at present used, the size of the tanks —1— is sufficient to accommodate three baskets stacked one upon the other, and each is equipped with a loose cover —63—.

The tank —1— is then sealed absolutely air-tight by means of the cover —4— having its edge set in a suitable compound or mixture, as above described, which solidifies to seal the joint.

The tank is then connected to the vacuum pump —29— by means of the U-shape pipe —22— bringing its respective pipe —18— into communication with pipe —26—, the joints between these pipes being sealed by solidification of the sealing compound about the depending flanges on pipe —22—.

The vacuum pump —29— is then started and the valve —59— to the tank is gradually opened, drawing vacuum at a speed of approximately 6″ of mercury per minute. When the vacuum has reached about 27″, the valve —59— is opened wide. At the end of 15 minutes the remaining pressure in the tank —1— is about one millimeter of mercury, the valve 59 is then closed, and the tank with the enclosed baskets and cans is allowed to stand 20 hours, during which time the powder gives off a portion of its contained or absorbed oxygen, or perhaps preferably in order to eliminate the entry of air or oxygen to the kettle as induced by the high vacuum therein, the respective valve —5— is opened, the reducing valve —53— being properly regulated, and the tank —1— which has been evacuated, is charged with carbon-dioxide, preferably up to a pressure of about two pounds per square inch. This charging as at present carried on, requires about six minutes.

The valve —50— is then closed and the tank with its enclosed baskets allowed to stand twenty hours, during which time the pressure of carbon-dioxide is used, will gradually decrease from two pounds to the square inch down to about ½ pound per square inch, the final pressure varying somewhat with temperature and barometric pressure.

When a gas such as nitrogen is ultimately used for charging the powder, it is perhaps preferable to hold the tank 20 hours under high vacuum, but in the case of $CO_2$, which is considerably absorbed by the powder, it is preferable to charge the tank before holding it, as this will reduce to some extent the ultimate vacuum developed in the cans after sealing, as later described.

At the end of the 20 hour period of treatment under either condition, the tank —1— is again connected to the vacuum pump —29— by a proper shifting of pipe —22— under control of valve —59— and the tank is again evacuated, and the pressure will again be reduced to about 1 millimeter of mercury, and the free or uncombined oxygen content is reduced by this operation to approximately 3.5 cubic centimeters for each pound of powder, which condition is below the limit required for producing the desired keeping quality of the powder, and eliminating the development of a tallowy flavor.

The communication with the vacuum pump is then cut off, the respective valve —50— opened and under control of regulating valve —53—, the tank is charged with carbon-dioxide to a pressure of about 10 pounds per square inch. This charging super-saturates the surface of the particles of the powder with carbon-dioxide, thereby causing a slow stream of carbon-dioxide to escape through the minute vents in the cans for about the first half hour after the pressure has been released, thereby, during the period necessary to the sealing of the vent-holes, preventing the ingress of air through the vent-holes to the interior of the cans.

The tank charged with carbon-dioxide to a pressure of substantially 10 pounds per square inch is allowed to stand about 30 minutes, and the pressure is then gradually relieved discharging the gas into the atmosphere. This operation requires about two or three minutes in order to get down to atmospheric pressure. When atmospheric pressure is reached in the tank —1—, the cover —4— is lifted, after steam has been passed through pipe —10— to melt the wax, and the baskets are then taken out of the tank and the vent-holes in the cans closed with solder as quickly as possible. The tanks are of such a size and the number of cans within the tank are of such a number that the vent-holes in all of the cans can be closed with solder, preferably within thirty minutes from the time the pressure was released, and as the cans are giving off carbon-dioxide during that period, entry of oxygen is not permitted.

The article of commerce so produced consists of an air-tight container charged with a gas not containing free or uncombined oxygen and enclosing milk-powder in which the free or uncombined oxygen content is below five cubic centimeters (measured under standard conditions) for each contained pound of milk powder, whereby a milk powder product, particularly one containing butter-fat is produced having a keeping quality never before attained or even approached. The cans may be tested for air-tightness in any suitable way.

When carbon-dioxide is the gas used, the cans are placed with the bottom up and left standing for at least seven days, during which time it is found that the carbon-dioxide will be gradually absorbed and a vacuum of from five to eight inches of mercury will be produced within the cans as a result of this partial absorption of the carbon-dioxide by the powder, and the vacuum existing in the cans will pull in the ends of the can.

After one week's time, the cans are all tested for depression of the bottom ends in any suitable manner, as by means of an electric bell-tester, which causes a bell to ring if the bottom end depression does not exceed a certain set distance. The absorption of carbon-dioxide by the powder and the vacuum resulting within the cans therefrom provides a certain and sure way of detecting at any time whether any of the cans are leaking as the vacuum increases for a considerable period of time up to 11 to 15 inches of mercury, and the leaking cans can be sorted out as it is essential to the keeping quality of this article of manufacture that the cans be air-tight. This product, in addition to the features above described, has the further characteristic that a vacuum exists in the container.

In the use of the apparatus here shown, the tanks may be all in the course of utilization at the same time, i. e. tank —1— may be filled and a vacuum drawn upon it. In the meantime, tank 2 is being filled, and when the proper degree of vacuum has been reached in tank No. 1, the pipe —18— leading from tank —2— is brought into communication with the pump by the movable pipe —22—, and while tank —1— is being charged with carbon-dioxide, or other gas, a vacuum is being drawn upon tank —2—. In like manner when the proper vacuum has been obtained in tank —2—, pipe —22— is lifted up and moved around so as to bring tank —3— into communication with the vacuum pump. So that the apparatus here shown constitutes a means whereby a substantially continuous process may be carried on throughout the day, the tanks being allowed to stand for 20 hours, and they are then successively evacuated, charged with carbon-dioxide, emptied, and the can sealed.

After the cans containing $CO_2$ or gas absorbed to a similar extent have been allowed to stand for about seven days, during which time a partial vacuum is produced within the cans, it is easy to determine the leaking cans by the fact that the ends of the can are drawn in, and after that has been determined and the good cans selected out, additional carbon-dioxide or suitable gas may be injected into the cans in any suitable manner so as to relieve the vacuum tending to collapse the cans, should that be desirable, and the cans may then again be sealed.

It will be obvious, however, that the process of this invention does not depend for its operation upon the particular apparatus shown, as other and different apparatus may be used and adapted for the purpose, and various changes may be made in the details of the process and in the particular pressures utilized and the particular gas, all without departing from this invention as set forth in the appended claims.

I claim:

1. The process of packing milk-powder comprising enclosing the milk-powder in a container air-tight except for a minute opening, enclosing a plurality of containers in an air-tight kettle, drawing a substantially perfect vacuum within the kettle, then admitting a gas not containing free or uncombined oxygen under pressure to the kettle, then allowing the kettle to stand with its enclosed containers for a considerable period of time while the entrance of oxygen is prevented, again drawing a substantially perfect vacuum within the kettle to thereby reduce the free or uncombined oxygen of the powder in the containers to an amount not substantially greater than five cubic centimeters for each pound of powder, again charging the kettle with a gas that does not contain free or uncombined oxygen so as to produce a pressure sufficiently above atmospheric pressure so that the egress of gas from the containers through said openings will prevent the ingress of air during the time necessary to effect sealing of said openings, and then sealing the openings in the containers.

2. The process of packing milk-powder comprising enclosing milk-powder in a container air-tight except for a minute opening, enclosing a considerable number of such containers in an airtight kettle, then producing a substantially perfect vacuum within the kettle, then admitting a gas that does not contain free or uncombined oxygen to the kettle so as to produce a pressure within the kettle not substantially less than two pounds per square inch, then holding the kettle as charged for a period approximating twenty hours, again producing a substantially perfect vacuum within the kettle to reduce the free or uncombined oxygen content of the powder in the containers to an amount not substantially greater than five cubic centimeters for each pound of powder, then charging the kettle with a gas which does not contain free or uncombined oxygen up to a pressure approximating ten pounds per square inch, then removing the containers from the kettle and sealing the openings in the containers without permitting increase of uncombined oxygen content substantially above five cubic centimeters per pound of powder.

In witness whereof I have hereunto set my hand this 20 day of January, 1925.

HELGE SCHIBSTED.